C. YOUNGER.
CORN GATHERER AND HUSKER.
APPLICATION FILED FEB. 5, 1912.

1,090,371.

Patented Mar. 17, 1914.
6 SHEETS—SHEET 1.

WITNESSES:
A. H. Edgerton
O. M. McLaughlin

INVENTOR.
Charles Younger
BY
V. H. Lockwood
ATTORNEY.

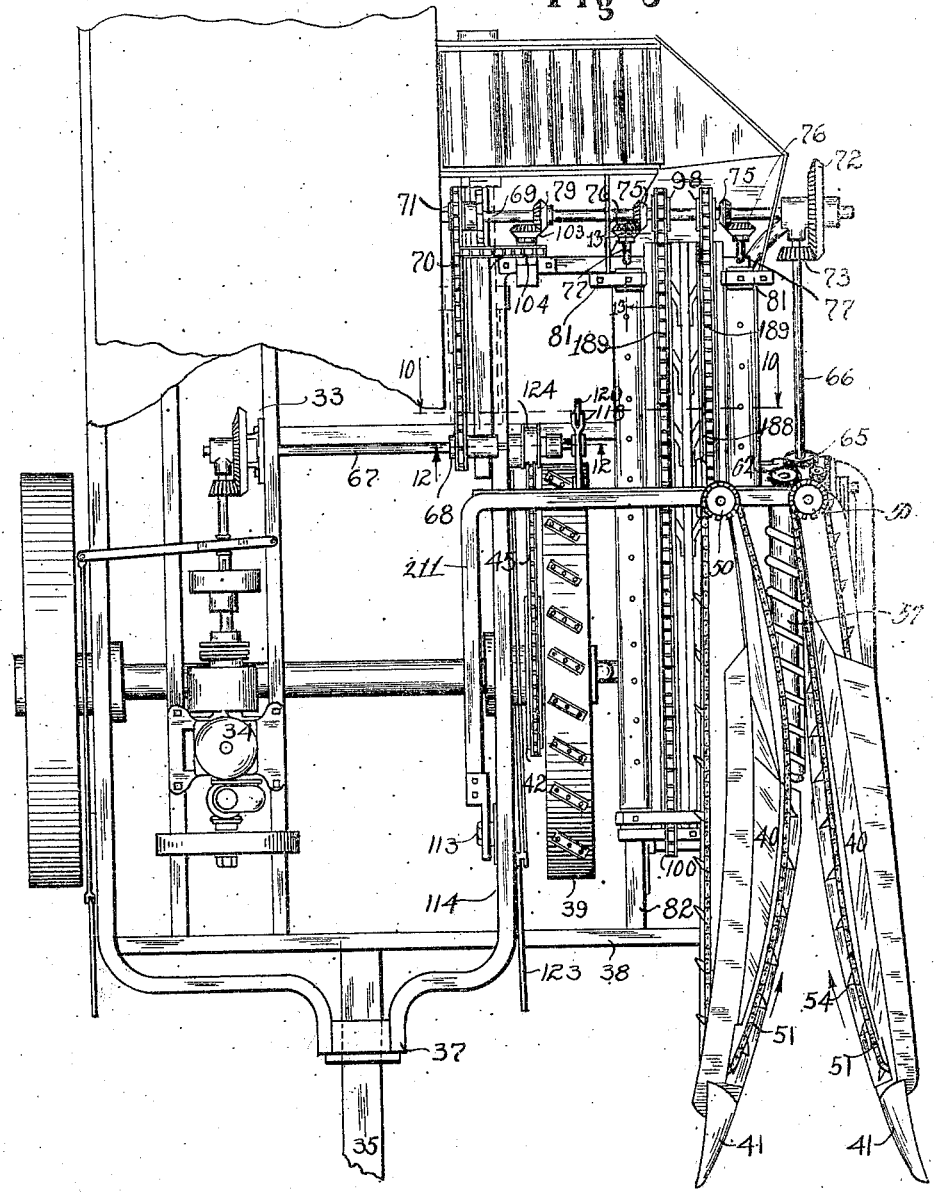

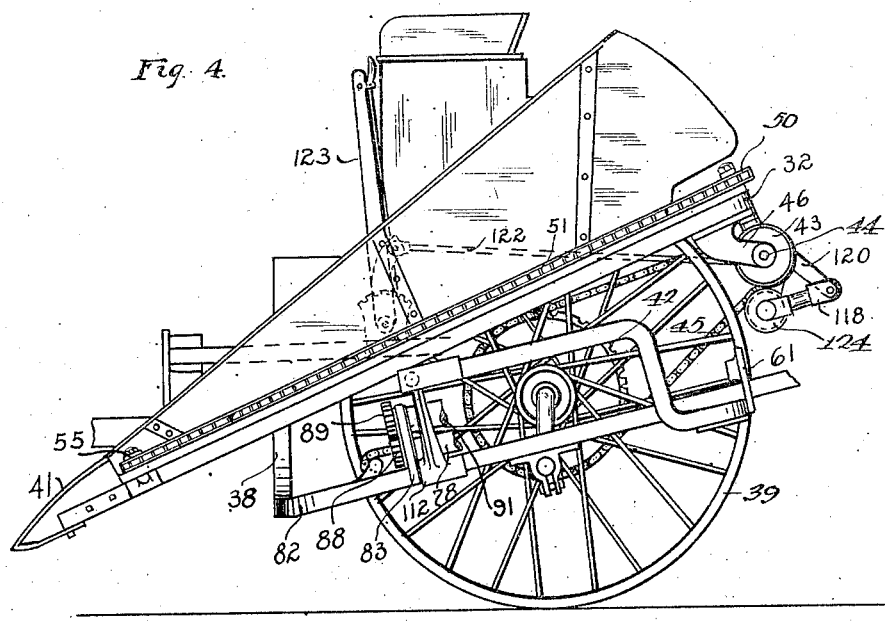
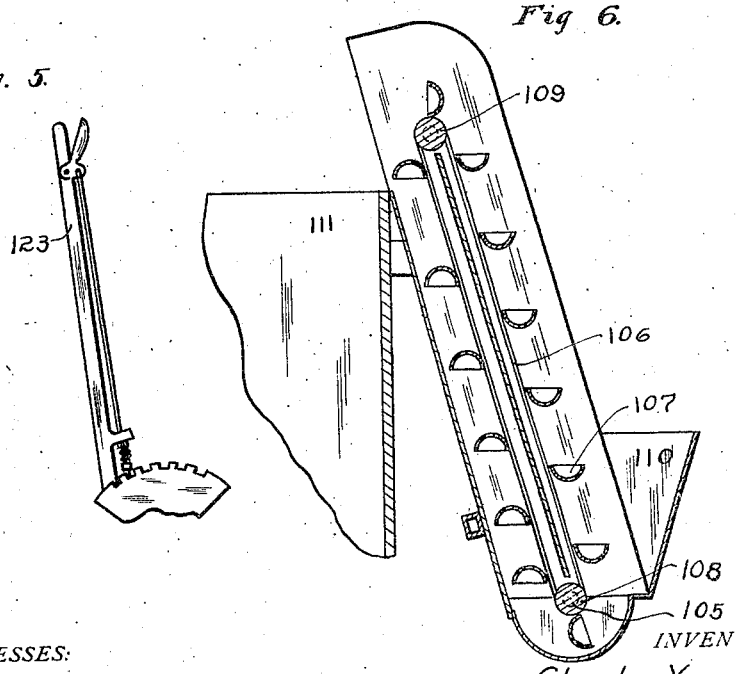

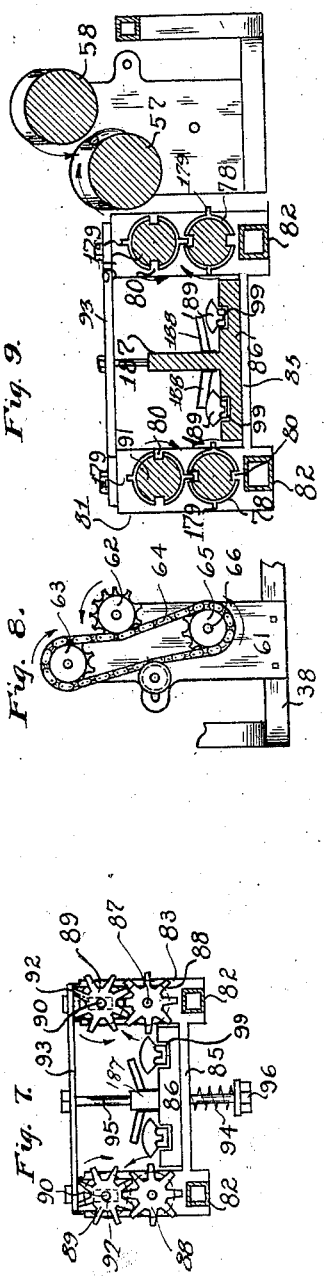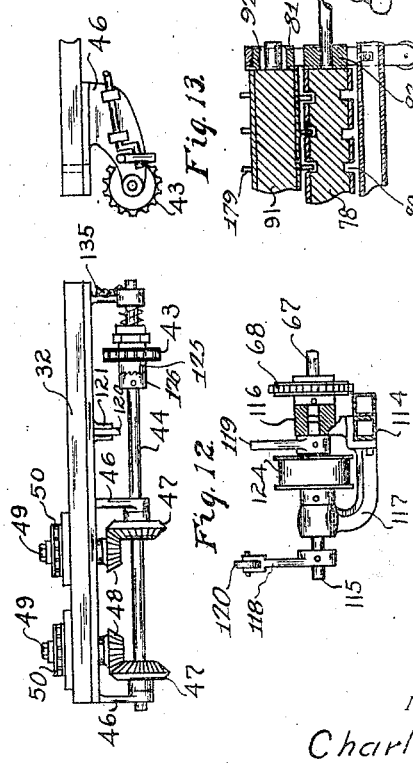

C. YOUNGER.
CORN GATHERER AND HUSKER.
APPLICATION FILED FEB. 5, 1912.
1,090,371.
Patented Mar. 17, 1914.
6 SHEETS—SHEET 6.
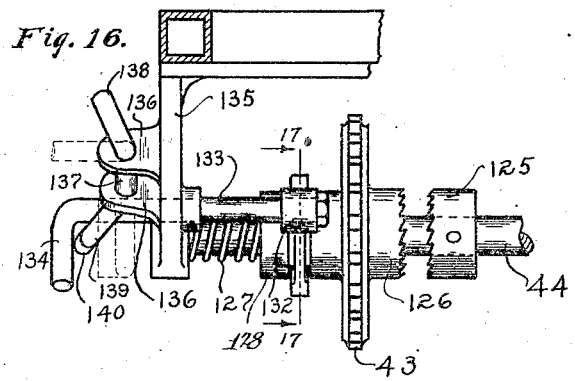
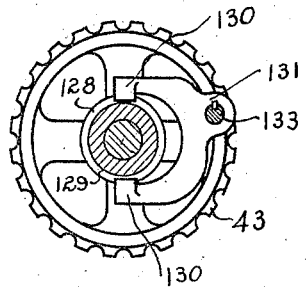
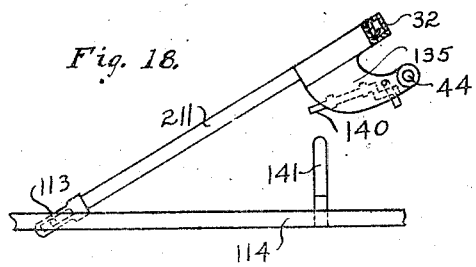
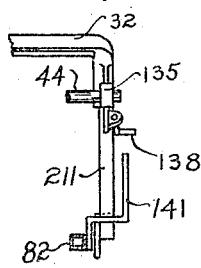
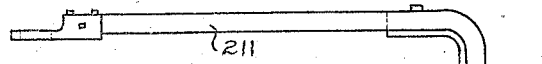
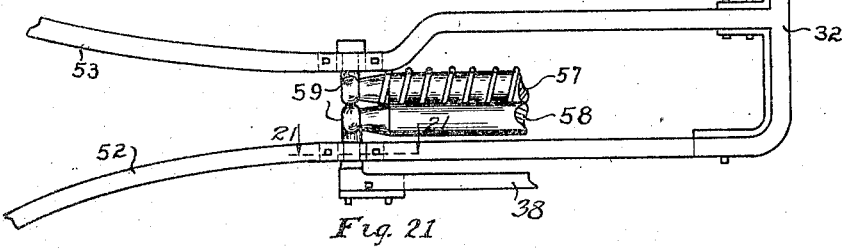
WITNESSES:
INVENTOR.
Charles Younger
BY
ATTORNEY.

UNITED STATES PATENT OFFICE.

CHARLES YOUNGER, OF RUSHVILLE, INDIANA, ASSIGNOR OF ONE-HALF TO ALPHEUS P. WALKER AND ONE-HALF TO CHARLES B. SMITH AND MARSHALL E. NEWHOUSE, ALL OF RUSHVILLE, INDIANA.

CORN GATHERER AND HUSKER.

1,090,371.  Specification of Letters Patent.  Patented Mar. 17, 1914.

Application filed February 5, 1912. Serial No. 675,624.

*To all whom it may concern:*

Be it known that I, CHARLES YOUNGER, a citizen of the United States, and a resident of Rushville, county of Rush, and State of Indiana, have invented a certain useful Corn Gatherer and Husker; and I do hereby declare that the following is a full, clear, and exact description thereof, reference being had to the accompanying drawings.

The object of this invention is to provide an improved corn gatherer and husker which shall be capable of gathering corn stalks as they are found in the field, whether standing or fallen, separating the ears therefrom, shucking them and delivering them to a suitable storage receptacle.

The features of the invention lie in so associating the working parts of the machine that the general direction of movement of the corn therethrough remains the same, and in oscillatably mounting a gatherer frame in such a manner that it may be elevated from the ground and automatically throw the gatherer driving mechanism out of gear.

Further features lie in mounting the mechanism upon a three wheeled truck of which the forward wheels bear the load and in attaching the tongue so that sudden pull by the team or tractor will not throw the machine off its balance and run the gatherer points into the ground.

Figure 1:
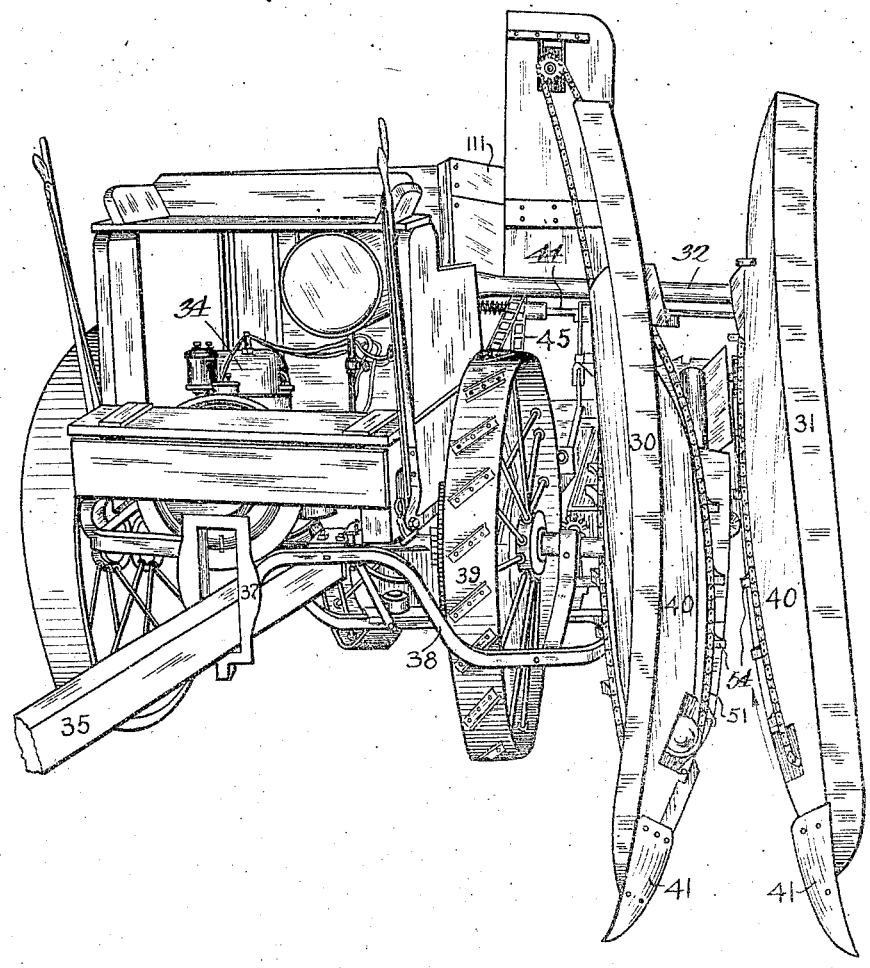
Figure 2:
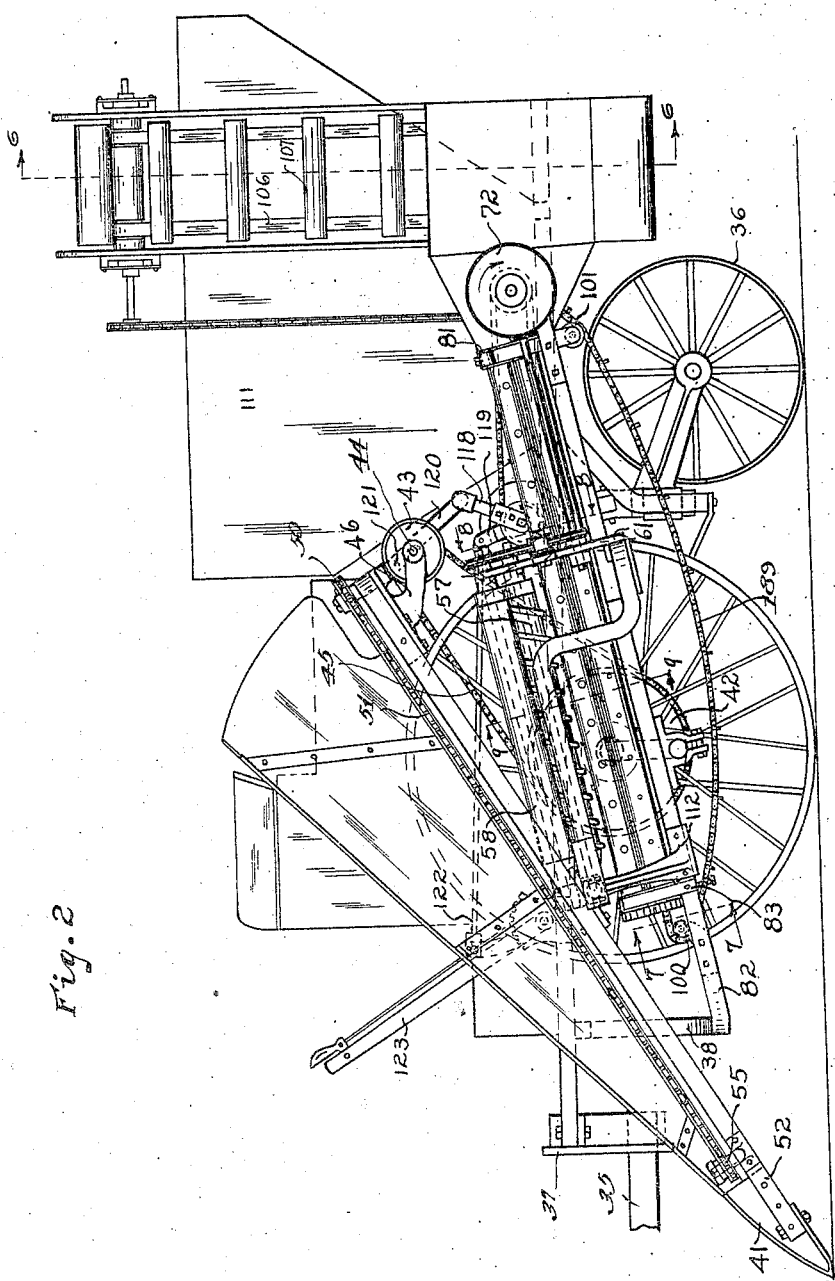

The nature of the invention will be understood from the accompanying drawings and the following description and claims:

In the drawings, Figure 1 is a perspective view of the front of the machine, the tongue being broken away. Fig. 2 is a right-hand elevation, showing the gatherer points resting upon the ground. Fig. 3 is a plan view of the same. Fig. 4 is a right-hand elevation, with portions broken away and portions removed, showing the gatherer elevated from the ground. Fig. 5 is a detail of the operating lever shown in Fig. 4. Fig. 6 is a vertical transverse section on the line 6—6 of Fig. 2. Fig. 7 is a section on the line 7—7 of Fig. 2, showing the means for driving the upper husking rolls. Fig. 8 is a section on the line 8—8 of Fig. 2, with portions broken away and portions removed, showing the method of driving the snapping rolls. Fig. 9 is a transverse section on the line 9—9 of Fig. 2, with portions omitted and showing the associated positions of the snapping and husking rolls. Fig. 10 is a section on the line 10—10 of Fig. 3. Fig. 11 is a side elevation of Fig. 10. Fig. 12 is a vertical transverse section on the line 12—12 of Fig. 3. Fig. 13 is a section on the line 13—13 of Fig. 3. Fig. 14 is a perspective of a pusher link in the husker conveyer chains. Fig. 15 is a perspective of a portion of the gatherer conveyer chains. Fig. 16 is an enlarged view of the right-hand portion of Fig. 10, showing the parts in inoperative position. Fig. 17 is a section on the line 17—17 of Fig. 16. Fig. 18 is a section through the gatherer frame, looking toward the engine. Fig. 19 is a rear elevation of Fig. 18. Fig. 20 is a plan view of the gatherer frame with portions of the associated parts removed. Fig. 21 is a section on the line 21—21 of Fig. 20.

In detail there is shown in the drawings, a corn gatherer and husker having gatherers 30 and 31 secured upon a frame 32 which is pivotally mounted in connection with a truck 33 carrying an internal combustion engine 34, said truck being drawn through the field by means of the tongue 35.

The truck 33, provided with the internal combustion engine 34, is of the three-wheeled type in which the rear wheel 36 acts as an idler, the tongue 35 being hinged to the frame about midway thereof and having vertical play through a slotted portion 37 in the forward part of said frame. The frame of said truck has a side extension 38 which surrounds the tractor wheel 39 and affords bearings for the gatherer frame 32.

The gatherers 30 and 31 are somewhat similar in shape and are formed of sheet metal plates 40 which are bent downward and inward toward the snapping rolls 57 and 58 hereafter described. Said plates have their upper edges flanged at right angles to the main portion. Said plates are secured to the gatherer frame 32 and at the forward ends plow shares 41 are riveted, see Figs. 1 and 2. A sprocket wheel 42, secured to the tractor wheel 39, drives the sprocket wheel 43 on a shaft 44 through a chain 45. The shaft 44 is mounted below the rear bar of the gatherer frame 32 by means of brackets 46 and 135 secured thereto and extending downward therefrom, see Fig. 10. Beveled gears 47 splined on said shaft 44 mesh with beveled pinions 48 on shafts 49 which carry sprocket wheels 50 for driving the gatherer chains 51. There is a sprocket wheel 55 mounted on each of the forwardly extending portions 52 and 53 of the gatherer frame 32 and there is an opening in the gatherer plates 40 adjacent thereto, such that one side of each of the closed gatherer chains 51 lies within the space between the inclined plates 40 and the other side lies outside of said plates, see Figs. 1 and 3. Said gatherer chains have pusher or conveyer links 54 at intervals therein, see Fig. 15, which have projections thereon and as the machine is drawn through the field the tractive effort of the wheel 39 will, through the chain 45, shaft 44 and beveled gears 47 and 48, cause said chains 51 to move in the direction of the arrows shown in Fig. 3, and will push the stalks of corn toward the snapping rolls.

There are two snapping rolls 57 and 58 which are inclined downwardly toward the front of the machine, as shown in Fig. 2, and have their forward ends mounted on inwardly extending bars 59 from the frame 38 and between the gatherers 30 and 31 in such a manner that the rolls are spaced apart a short distance. The rear ends of said rolls are mounted in a plate 61 secured at the rear of said frame 38. The roll 57 lies slightly below the roll 58 and to one side and there is a spiral projection or thread on said roll 57 for forcing corn stalks toward the rear. The shafts of the snapping rolls 57 and 58 extending through the rear supporting plate 61, have sprocket wheels 62 and 63, respectively, keyed thereon, which are driven through the chain 64 from a sprocket wheel 65 on a shaft 66, driven by the internal combustion engine on the truck 33.

As shown in the drawings, there is an internal combustion engine 34 mounted on the truck 33 and this is suitably geared to drive the shaft 67 which carries a sprocket wheel 68 and drives the shaft 69 by means of the chain 70 and sprocket 71 on said shaft. Said shaft 69 is mounted on the rear end of the frame 38 and on its outer end, as shown in Fig. 3, carries a bevel gear 72 which meshes with a bevel gear 73 on the shaft 66 on the other end of which is keyed the sprocket wheel 65, before mentioned. The beveled gears 75 keyed on the shaft 69 and meshing with the beveled gears 76 on the shafts 77, serve to drive the lower husking rolls 78. The beveled gear 79, secured on said shaft 69, drives the elevating and conveying apparatus, hereafter noted.

The husking rolls are four in number, arranged in pairs and rotated in the directions shown in Fig. 9. The lower husking rolls 78 have fixed bearings in the plates 81 secured to the longitudinal frame bars 82 at the rear and in some short plates 83 secured to the bars 82 near the front. There is a plate 85 integral with said end plates 81 and 83 for supporting a conveyer plate 86. The shafts 87 of the lower husking rolls 78 extend through the front end plate 83 and have gears 88 secured thereon which mesh with gears 89 on the shafts 90 of the upper husking rolls 91. Said shafts 90 extend through vertical slots 92 in said plates 81 and 83, such that the upper husking rolls 91 may have vertical movement. There is a plate 93 which bears on the upper husking rolls 91 and is drawn downward by the action of a spring 94 surrounding a bolt 95 which extends through said plates 93 and 85. Said spring bears against the plate 85 and a nut 96 on the bolt 95. The gears 88 and 89 are provided with long narrow teeth, such that they may remain in mesh when the upper husking rolls 91 are separated from the lower rolls 78. Said husking rolls are substantially circular in cross section and have on their surface alternate rows of projecting pins 179 and cavities 80 of slightly larger diameter than the pins 179. The lower and upper husking rolls are so related that the pins 179 will mesh with the cavities 80, as the rolls are rotated. The axes of all four of the husking rolls are parallel with the axes of the snapping rolls, although not in the same plane with the axes of both the snapping rolls.

The conveyer plate 86 is supported by the plate 85, as before mentioned, and slightly below the center of the lower husking rolls 78. Said plate 86 has a central upward projection 187 with leaf springs 188 secured at both sides. Said springs are inclined toward the rear and one end lies over the conveyer chain 189. The conveyer chains 189 are driven from sprocket wheels 98 keyed to the shaft 69 and the upper side of said chains 189 travels in a groove 99 in the upper side of the plate 86. There are sprocket wheels 100, see Figs. 2 and 3, secured to the longitudinal bars 82 near the forward end of the husking rolls over which the chain 189 passes and there are guide sprockets 101 secured to the underneath side of the bars 82 near the rear end of the frame.

The bevel gear 79, secured on the shaft 69, meshes with a second beveled gear 103 on the same shaft with a sprocket wheel 104 which is adapted to drive the lower shaft 105 of the elevating apparatus. Said elevating apparatus may be of any desired construction. As here shown there is a belt 106 carrying buckets 107 thereon, which travels over pulleys 108 and 109, picking up the corn in the buckets 107 from the bin 110 and discharging it into the storage bin 111.

The gatherer frame 32, before mentioned, is formed of tubing or other suitable material and is mounted upon the truck frame in such a manner that it may be turned from the position shown in Fig. 2, where the shares 41 are touching the ground, to the position shown in Fig. 4, where the shares are elevated above the ground. As shown in Fig. 20, one of the forwardly extending bars 211 is substantially one-half the length of the bars 52 and 53. Said bars 52 and 53 have fixed bearings about midway of their length on the upwardly extending brackets 112 from the truck frame bars 38 and 82, while the end of the bar 211 is pivoted on a pin 113 in the main frame 114 of the truck 33, see Fig. 3. The end of the bar surrounding the pin 113 is slotted longitudinally to allow a turning of the frame as the pin 113 is not in line with the bearings on the brackets 112. The forward ends of the bars 52 and 53 are flared outwardly. The gatherer frame is oscillated and the shares 41 are elevated by means about to be described.

A short shaft 115, coaxial with the shaft 67 and having bearing in the outer bearing 116 for said shaft and in a bracket 117 secured to the frame 114, carries cranks 118 and 119 secured thereon. The crank 118 has a bifurcated end pivotally connected with one end of a link 120, whose other end is pivoted between lugs 121 on the under side of the rear bar of the gatherer frame 32, see Figs. 2, 4, 10 and 12. The end of the crank 119 is connected through the reach rod 122, see dotted lines in Figs. 2 and 4, with the operating lever 123 mounted on the frame bar 114. It will be readily understood that a rearward movement of the lever 123 will depress the rear and elevate the forward end of the gatherer frame 32. There is a pulley 124 free to turn upon the shaft 115 upon which the chain 45 and sprocket wheel 43 will bear in the operated position of the gatherer frame.

An automatic means is provided for throwing the gatherer chain out of gear with its driving mechanism when the gatherer frame is moved to its inoperative position. As shown in Figs. 10 and 16, there is a clutch 125 on the shaft 44 for engaging the hub 126 of the sprocket wheel 43 and a spring 127 surrounding the shaft 44 and bearing against the bracket 135 and the extended hub 128 of said sprocket 43 for causing such engagement. A groove 129 is cut about said extended hub 128 into which extend two oppositely disposed fingers 130 on the arm 131 secured to the operating shaft 133. Said shaft extends through and has bearing in the brackets 135 and has its outer end 134 bent at a right angle, as shown in Fig. 16. Lugs 136 on the outside of the bracket 135 afford bearings for a vertical portion 137 of the actuating arm, whose upper portion 138 is bent at right angles thereto and with its lower portion 139 also bent at a right angle but in a plane at 90 degrees with the plane of the arms 137 and 138. The end 140 of the arm is bent at a right angle with the portion 139 and lies in the same plane with the portions 137 and 139 and engages the bent end of the shaft 133. There is an upward projection 141 from the frame bar 114 adapted when the frame 32 is elevated to engage the end 158 of the actuating arm and move the several parts from the dotted to the full line position shown in Fig. 16, and cause the separation of the clutch members 125 and 126.

In operation the machine is drawn into the cornfield, the lever 123 is then operated to depress the shares 41 of the gatherer frame, the internal combustion engine 34 is started, the working parts thrown into engagement with it, and the machine is then drawn through the field with one gatherer frame on each side of a row of corn. Should any stalks be lying upon the ground they will be picked up by the gatherer frame and the pusher links 54 on the chain 51 will assist in moving both the fallen and standing stalks toward the rear and between the snapping rolls 57 and 58, where the ears of corn will be pulled or snapped from the stalk. The stalk will be left to the rear of the machine, but the unhusked ears of corn will fall onto one of the husker conveyer chains 189 at the forward end of the plate 86, from whence they will be pushed toward the rear by the pusher links 102 on said chain and pressed to one side by the springs against the oppositely turning husking rolls 78 and 91, where the husks will be caught between the pins 179 and cavities 80 on said rolls and pulled from the ears. The husked corn will be carried to the rear by said chains 189 and deposited in the hopper 110 from which they are elevated by the belt conveyer and discharged into the storage bin at the rear of the machine.

By the three wheel construction here used, a great advantage is derived; that of being able to directly control the direction of travel of the gatherers, as the smallest side movement of the team will cause a movement of the gatherers, while in a four wheel construction the gatherers are uninfluenced by a small side movement of the team and only have their direction of travel changed when, after the team has given a wide side movement, the direction of the rear wheels is changed which causes corresponding change of the gatherers.

I claim as my invention:

1. A corn gathering machine including a truck, means for gathering the corn from standing stalks and having dividers spaced apart to form a stalk passage between them, said gathering means being fulcrumed between its ends on said truck, means for oscillating the gathering means on a transverse axis whereby the ends will be vertically adjusted, and snapping rolls associated with said gathering means.

2. A corn gathering machine including a truck, means for gathering the corn from standing stalks and having dividers spaced apart to form a stalk passage between them, said gathering means being fulcrumed between its ends, means for oscillating the gathering means on a transverse axis whereby the ends thereof will be vertically adjusted, and snapping rolls associated with said gathering means.

3. A corn gathering machine including snap rolls journaled in fixed bearings gathering means for gathering the corn from standing stalks and having dividers spaced apart to form a stalk passage between them and located above the snap rolls and fulcrumed between its ends near the forward end of the snap rolls and extending rearward beyond the snap rolls, and means for oscillatably adjusting the rear end of the gathering means, whereby its adjustment will not interfere with the snap rolls.

4. A corn gathering and husking machine including a frame, a gathering means having dividers spaced apart to form a stalk passage between them and fulcrumed between its ends in said frame, means for oscillatably adjusting said gathering means, snap rolls under the rear portion thereof, and husking rolls under the snap rolls and gathering means and extending rearward and longitudinally thereof.

5. A corn gathering machine including a truck adapted to be drawn through a corn field, a gathering frame oscillatably mounted on said truck, means for oscillatably and vertically adjusting said frame, chains movable longitudinally of said frame for drawing in the corn stalks and gathering the corn, and means actuated by said adjusting means for stopping and starting the chains.

6. A corn gathering machine including a truck adapted to be drawn through a corn field, a gathering frame oscillatably mounted on said truck, means for oscillating and vertically adjusting said frame, chains movable longitudinally of said frame for drawing in the corn stalks and gathering the corn, and means operated by the movement of said frame for starting and stopping said chains.

In witness whereof, I have hereunto affixed my signature in the presence of the witnesses herein named.

CHARLES YOUNGER.

Witnesses:
  SAMUEL L. INNIS,
  JAMES BENNETT.